United States Patent
Kong et al.

(10) Patent No.: US 9,906,151 B2
(45) Date of Patent: Feb. 27, 2018

(54) MINIMUM OFF-TIME ADAPTIVE TO TIMING FAULT CONDITIONS FOR SYNCHRONOUS RECTIFIER CONTROL

(71) Applicant: Dialog Semiconductor Inc., Campbell, CA (US)

(72) Inventors: Pengju Kong, Campbell, CA (US); Wenbo Liang, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 105 days.

(21) Appl. No.: 14/835,487

(22) Filed: Aug. 25, 2015

(65) Prior Publication Data

US 2017/0063246 A1    Mar. 2, 2017

(51) Int. Cl.
*H02M 3/335* (2006.01)
*H02M 1/32* (2007.01)

(52) U.S. Cl.
CPC .......... *H02M 3/33592* (2013.01); *H02M 1/32* (2013.01); *H02M 2001/325* (2013.01); *Y02B 70/1475* (2013.01)

(58) Field of Classification Search
CPC ............... H02M 3/33592; H02M 1/32; H02M 2001/325
See application file for complete search history.

(56) References Cited

U.S. PATENT DOCUMENTS

| 2014/0003096 | A1 | 1/2014 | Deng | |
|---|---|---|---|---|
| 2014/0340944 | A1* | 11/2014 | Tzeng | H02H 7/1213 363/21.17 |
| 2016/0056723 | A1* | 2/2016 | Seok | H02M 3/1588 323/282 |
| 2016/0172999 | A1* | 6/2016 | Fogg | H02M 3/1588 363/53 |

FOREIGN PATENT DOCUMENTS

| EP | 0996219 A2 | 4/2000 |
|---|---|---|
| JP | 2011-015477 | 1/2011 |
| JP | 2014-011814 | 1/2014 |
| KR | 10-2009-0125321 | 12/2009 |

OTHER PUBLICATIONS

PCT Search Report and Written Opinion dated Nov. 24, 2016 from corresponding International Application No. PCT/US2016/048770.

* cited by examiner

*Primary Examiner* — Fred E Finch, III
*Assistant Examiner* — Rafael O. De León Domenech
(74) *Attorney, Agent, or Firm* — Haynes & Boone, LLP

(57) ABSTRACT

A switching power converter may include a power switch coupled to a primary winding of a transformer, and a primary controller configured to turn on and off the power switch, a synchronous rectifier switch coupled to a secondary winding of a transformer, and a synchronous rectifier controller configured to turn on and off the synchronous rectifier switch. The synchronous rectifier controller may monitor a voltage across the synchronous rectifier switch. The synchronous rectifier controller may detect a fault condition responsive to the voltage reaching a turn-off voltage threshold before a minimum on-time timer expires. The synchronous rectifier controller may detect a fault condition responsive to the synchronous rectifier switch being turned off at the same time, immediately after, or within a timing guardband after the minimum on-time timer expires. The synchronous rectifier controller may adaptively increase a minimum off-time period for the synchronous rectifier switch.

17 Claims, 4 Drawing Sheets

MINIMUM OFF-TIME ADAPTIVE TO TIMING FAULT CONDITIONS FOR SYNCHRONOUS RECTIFIER CONTROL

TECHNICAL FIELD

This application relates to switching power converters, and more particularly to switching power converters that use synchronous rectification.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. A conventional flyback converter that uses a rectifying diode at the secondary (load) side of its transformer has significant power loss due to a relatively high forward voltage drop in the rectifying diode. Thus, synchronous rectification techniques have been developed that replace the rectifying diode with an actively controlled switch such as a field-effect transistor (FET) device (e.g., a metal oxide field-effect transistors (MOSFET) device) to improve operating efficiencies by taking advantage of its lower power losses.

Conventional flyback converters with synchronous rectification typically include a synchronous rectifier controller that controls the synchronous rectifier switch (S2) based on a voltage across the synchronous rectifier switch terminals. When this voltage falls below an on-time threshold voltage, the controller switches on the synchronous rectifier switch S2 so that power is delivered to load. During this power delivery, the voltage across the synchronous rectifier switch S2 gradually rises above the on-time threshold voltage until it crosses an off-time threshold voltage. This off-time threshold voltage corresponds to the voltage across the synchronous rectifier switch at the transformer reset time when the secondary winding current has ramped down to zero.

The timing of the on and off states for the synchronous rectifier switch is critical to reduce losses. But the control with regard to the on-time and off-time threshold voltages is problematic because the voltage across the synchronous rectifier switch S2 will have a resonant oscillation at the switch on times and off times due to parasitic effects. When the synchronous rectifier switch S2 is switched on, this resonant ringing could cause the switch voltage to exceed the off-time threshold voltage such that the controller would undesirably switch off the synchronous rectifier switch even though the secondary winding current is still relatively robust (it being well before the transformer reset time). To prevent such an undesirable premature cycling off of the synchronous rectifier switch S2, it is conventional for the controller to apply a minimum on-time period with regard to monitoring the off-time threshold voltage following the cycling on of the synchronous rectifier switch S2. During this minimum on-time period, the controller does not respond to the synchronous rectifier switch S2 voltage exceeding the off-time threshold voltage.

An analogous minimum off-time period follows the cycling off of the synchronous rectifier switch S2 to prevent the controller from responding to a resonant oscillation of the switch voltage that causes the switch voltage to fall below the on-time threshold voltage. But in contrast to the resonant oscillation that occurs at the synchronous rectifier switch S2 on-time, the resonant oscillation at the switch off-time is markedly more robust and prolonged. This robust off-time oscillation of the switch voltage complicates the setting of an appropriate duration for the minimum off-time period that may be better appreciated through a consideration of the waveforms shown in FIG. 1 for a power cycle 110 and a power cycle 120 of a primary-side power switch S1. In this example, the voltage across the synchronous rectifier switch S2 is a drain-to-source ($V_{D-S}$) voltage for a MOSFET. In response to the cycling off of power switch S1, the drain-to-source voltage for synchronous rectifier switch S2 falls below the on-time threshold voltage. The synchronous rectifier switch S2 is thus switched on while at the same time a timer (S2 Min $T_{ON}$ Timer) is started to time the minimum on-time period. The resulting resonant oscillation of the drain-to-source voltage is relatively minor and quickly damped such that the duration of the minimum on-time period may be relatively short.

In response to the cycling on of the synchronous rectifier switch S2, the secondary winding current pulses on and begins to ramp down until it reaches zero at the transformer reset time (T1 Reset). At the same time, the drain-to-source voltage for switch S2 rises above the off-time threshold voltage (S2 OFF Threshold) such that the S2 switch is switched off and a timer (S2 MIN $T_{OFF}$ Timer) begins timing the minimum off-time period. The resulting resonant oscillation for the drain-to-source voltage following the synchronous rectifier switch S2 off time is more pronounced and slower to damp as compared to the damping that occurs at the on time for synchronous rectifier switch S2. For power cycle 110, the minimum off-time period has a proper duration such that the resonant oscillations of the drain-to-source voltage do not cross the on-time threshold voltage following the termination of the minimum off-time period.

But the resonant oscillations following the synchronous rectifier switch S2 off time are more pronounced for a subsequent power cycle 120 of power switch S1. Due to this more pronounced resonance, the drain-to-source voltage crosses the on-time threshold voltage at a time 122 following the termination of the minimum off-time period in power cycle 120. As a result, the controller cycles the synchronous rectifier switch S2 on despite there being no power pulse to deliver. The result is that the secondary winding current has a slightly negative value during the minimum on-time period following time 122. Upon the termination of this undesirable minimum on-time period, the drain-to-source voltage exceeds the off-time threshold voltage such that the synchronous rectifier switch S2 is cycled off for another minimum off-time period. But the subsequent resonant oscillation of the drain-to-source voltage again causes the drain-to-source voltage to cross the on-time threshold voltage such the synchronous rectifier switch S2 is again cycled on a time 124. Another negative current is induced on the secondary winding until the termination of the subsequent minimum on-time period whereupon the drain-to-source voltage again exceeds the off-time threshold voltage such the synchronous rectifier switch S2 is opened.

The resulting cycling on and off of the synchronous rectifier switch S2 following the transformer reset time is undesirable for a number of reasons. For example, the negative current excited across the secondary winding wastes power. More fundamentally, the synchronous rectifier switch S2 may be cycled on when the power switch cycles on, which is a severe problem. The prior art setting of the minimum off-time period is thus problematic in that it cannot be set too short or this undesirable cycling of the synchronous rectifier switch S2 occurs yet it cannot be set too long in that the minimum off-time period would then interfere with the next power switch S1 cycling.

Accordingly, there is a need in the art for improved synchronous rectifier control techniques for switching power converters.

SUMMARY

To address the need in the art for improved synchronous rectification techniques, a switching power converter is provided with a synchronous rectifier controller configured to monitor a duration en of an on-time period for a synchronous rectifier switch. If the duration is too short, the synchronous rectifier controller increases a duration of a minimum off-time period for the synchronous rectifier switch to address the resulting fault detection. In this fashion, resonant oscillation of a voltage across the synchronous rectifier switch is prevented from causing the synchronous rectifier controller to repeatedly cycle the synchronous rectifier switch on and off in between on-times for a power switch.

In particular, it is desirable that the synchronous rectifier controller maintain the synchronous rectifier switch off following a transformer reset time and prior to a subsequent cycling on of the power switch. But due to the resonant oscillations of the voltage across the synchronous rectifier switch after it is switched off, conventional synchronous rectifier controllers could undesirably cycle the resonant switch on prior to the cycling on of the power switch. The voltage across the synchronous rectifier switch would then promptly cross the off-time threshold voltage to trigger a cycling off of the synchronous rectifier switch following the expiration of the minimum on-time period for synchronous rectifier switch. This cycling off of the synchronous rectifier switch then triggers yet another resonant oscillation of the voltage across the synchronous rectifier switch, which in turn raises the danger of yet another undesirable cycling on of the synchronous rectifier switch. In this fashion, the synchronous rectifier switch could continue to cycle on and off such that the normal power delivery to the load is disrupted.

To address this problem, it was known to adjust the minimum off-time period by monitoring the voltage across the synchronous rectifier switch during the duration of the minimum off-time period. But such conventional techniques are undesirable in that minimum off-time period may be extended such that the cycling of the power switch is missed. In contrast, the disclosed monitoring of the minimum on-time period advantageously prevents the undesirable repeated cycling on of the synchronous rectifier switch subsequent to the transformer reset time and prior to the cycling off of the power switch. These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems, devices, and methods are provided that allows for a cycle-by-cycle adaptive setting of a minimum off-time timer for synchronous rectification.

Figure 2:
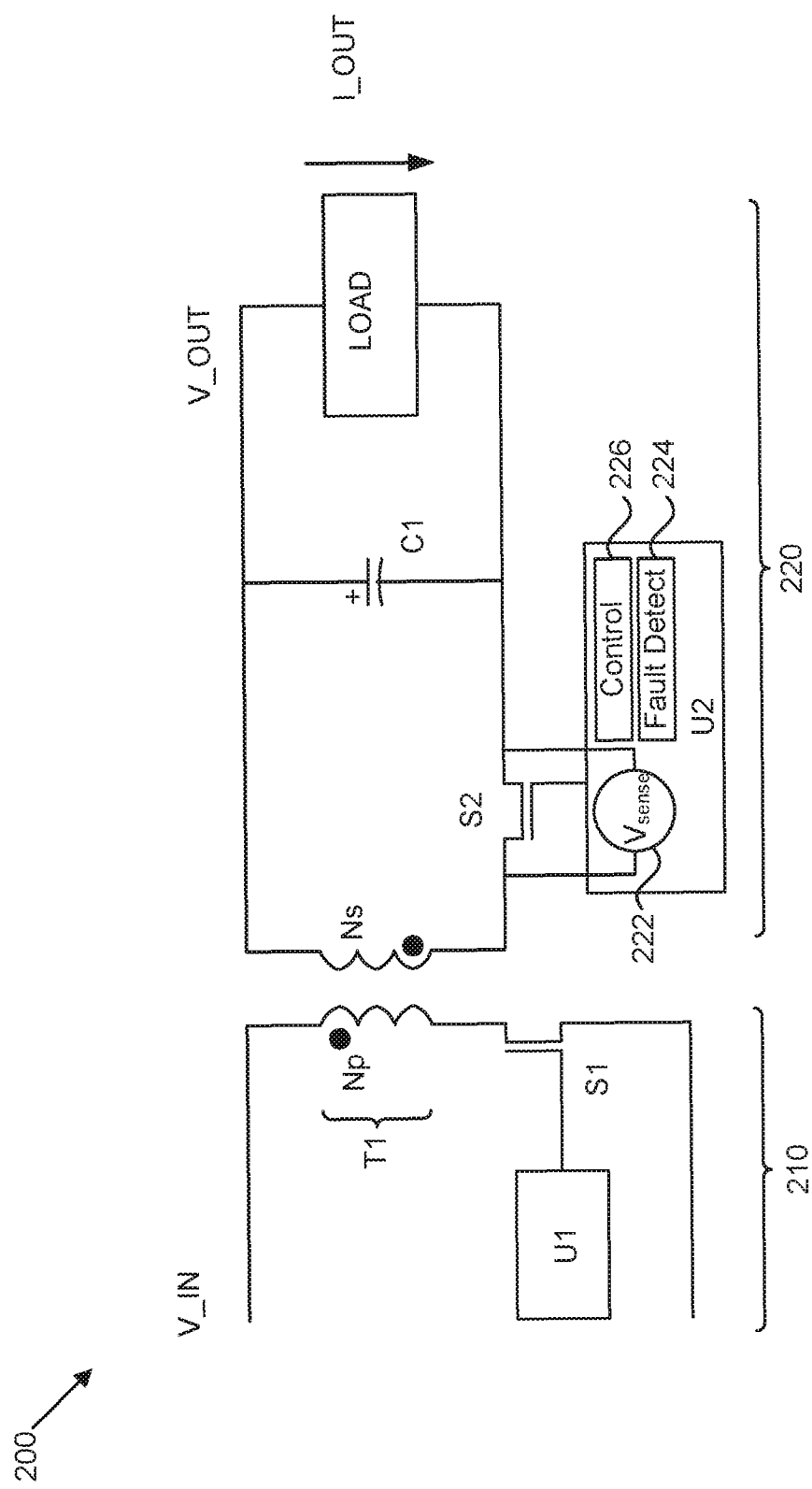
FIG. 2 is a diagram of a flyback converter configured for adaptive synchronous rectifier control in accordance with an embodiment of the disclosure.

An example flyback converter 200 configured for adaptive synchronous rectifier control is shown in FIG. 2. In various embodiments, flyback converter 200 includes a primary side such as a power stage 210 and a secondary side such as a secondary output stage 220. Power stage 210 may include a power switch S1, a primary controller U1 configured to control the on state and the off state of power switch S1, and primary windings Np of a transformer T1. Controller U1 may maintain the output regulation of flyback converter 200 by controlling the on and off states of power switch S1. Secondary output stage 220 may include a synchronous rectifier switch S2, an adaptive synchronous rectifier controller U2 configured to control the on state and the off state of a synchronous rectifier switch S2, secondary windings Ns of transformer T1, and an output capacitor C1. Power switch S1 and synchronous rectifier switch S2 may each be a field-effect transistor (FET) device (e.g., a metal oxide field-effect transistors (MOSFET) device), a bipolar junction transistor (BJT) device, or other appropriate switch.

In some embodiments, adaptive synchronous rectifier controller U2 includes a voltage sensor 222, a minimum on-time timer 224, and a control logic circuit 226. Voltage sensor 222 may be configured to monitor a voltage across synchronous rectifier switch S2 by sensing through one or more terminals of adaptive synchronous rectifier controller U2. Timer 224 may comprise analog or digital circuitry. Control circuit 226 may comprise logic gates or a microcontroller. Control circuit 226 may be configured to turn on synchronous rectifier switch S2 for at least a minimum on-time period responsive to the voltage sensed by voltage sensor 222 crossing an on-time threshold voltage. Similarly, control circuit 226 may be configured to turn off synchronous rectifier switch S2 for at least a minimum off-time period responsive to the sensed voltage crossing an off-time threshold voltage. By comparing a duration of each on-time period to the duration of the minimum on-time period as timed by timer 224, control circuit 226 may determine when the duration of a given on-time period is too short so as to trigger a detection of a fault condition. In one embodiment, such a "too short" duration may equal the duration of the minimum on-time period. In alternative embodiments, the duration of an on-time period must be less than or equal to a sum of the minimum on-time period and a guard band period.

In response to the detection of the fault condition, control circuit 226 may adaptively increase the minimum off-time period. This increase of the minimum off-time period may be limited to not exceed a maximum allowable off-time period such that the synchronous rectifier controller U2 may be ready to switch on the synchronous rectifier switch S2 in response to a power switch S1 being cycled off. In further embodiments, voltage sensor 222, timer 224, and a controller circuit 226 may be implemented using a combination of hardware, software, and/or firmware components.

In various embodiments, when power switch S1 is placed in the on state, an input voltage V_IN drives a primary current into the primary windings Np of transformer T. Based upon the input voltage V_IN and a magnetizing inductance for transformer T1, the primary current ramps up from zero Amperes (Amps) to a peak current value, whereupon controller U1 turns off power switch S1 to complete a power cycle.

In various embodiments, synchronous rectifier switch S2 is placed in the on state when power switch S1 is placed in the off state in order to deliver energy stored in transformer T1 to secondary output stage 220, and placed in the off state when the energy stored in transformer T1 is exhausted such as at the transformer reset time. Synchronous rectifier controller U2 thus turns on synchronous rectifier switch S2 when controller U1 turns off power switch S1 such that the stored energy in transformer T1 is delivered as an output voltage V_OUT across a load as filtered by output capacitor C1 in conjunction with a pulse of secondary current in secondary winding Ns of transformer T1. For example, adaptive synchronous rectifier controller U2 may turn on synchronous rectifier switch S2 responsive to the voltage across synchronous rectifier switch S2 crossing an on-time threshold voltage (e.g., approximately −400 mV). As the energy delivery from transformer T1 is depleted, the secondary current will ramp to zero Amps. The transformer reset point (T1 reset) occurs when the secondary current reaches zero Amps, at which point synchronous rectifier controller U2 turns off synchronous rectifier switch S2. For example, adaptive synchronous rectifier controller U2 may turn off synchronous rectifier switch S2 responsive to the voltage across synchronous rectifier switch S2 reaching an off-time threshold voltage (e.g., 0 V).

For improved operating efficiencies, synchronous rectifier controller U2 may control synchronous rectifier switch S2 to provide functional operations similar to a diode device despite the bi-directional current flow that could occur through synchronous rectifier switch S2. Following the transformer reset time and prior to a subsequent cycling on of the power switch S1, synchronous rectifier controller U2 should maintain synchronous rectifier switch S2 off. But as discussed previously, the resonant oscillation of the voltage across synchronous rectifier switch S2 following it being cycled off and continuing past the minimum off-time period may cause this voltage to cross the on-time threshold voltage such that the synchronous rectifier switch is then turned on. Since this erroneous cycling on of the synchronous rectifier switch is conducted prior to the cycling on of the power switch S1, the off-time threshold voltage will be promptly violated after expiration of the minimum on-timer period. Synchronous rectifier controller U2 monitors the duration of the on-time period to detect whether it equals the minimum on-time period (or whether it is within a guard band period of the expiration of the minimum on-time period) to trigger a fault condition.

In various embodiments, adaptive synchronous rectifier controller U2 is configured to increase the minimum off-time period of synchronous rectifier switch S2 responsive to the detection of the fault condition to prevent the fault condition from persisting. This advantageous prevention of further episodes of the fault condition may be better understood with consideration of the waveforms shown in FIG. 3. Following an on-time period for power switch S1 in a power cycle 310, controller U1 places power switch S1 in the OFF state, causing the drain-to-source voltage waveform ($V_{D-S}$) for the voltage across synchronous rectifier switch S2 to cross an on-time threshold voltage (S2 ON threshold). This threshold crossing causes synchronous rectifier controller U2 to place synchronous rectifier switch S2 in the on state. Also at this point, the minimum ON-time timer (S2 MIN $T_{on}$ timer) is initiated. Once all the energy has been delivered to the secondary output stage 220 and the secondary current reaches zero Amps, the $V_{D-S}$ waveform resonantly rises subsequent to the minimum on-time period so as to cross the off-time threshold voltage (S2 OFF threshold). The $V_{D-S}$ waveform does not trigger the on-time threshold voltage until the next power cycle 320 begins, thus representing proper synchronous rectifier control.

During power cycle 320 of power switch S1, controller U1 cycles power switch S1 off, which causes the $V_{D-S}$ waveform to cross the on-time threshold voltage. This threshold crossing in turn causes synchronous rectifier controller U2 to cycle synchronous rectifier switch S2 on. At the same time, the minimum ON-time timer is initiated. Once all the energy has been delivered to the secondary output stage 220 and the secondary current reaches zero Amps, the $V_{D-S}$ waveform rises so as to exceed the off-time threshold voltage such that the synchronous rectifier switch S2 is cycled off.

Following the minimum off-time period, resonant oscillation of the $V_{D-S}$ waveform may cause the $V_{D-S}$ waveform to cross the on-time threshold voltage at time 322 so as to cause a premature cycling on of the synchronous rectifier switch S2. This also restarts the minimum ON-time timer. Since all the energy in transformer T1 has been delivered, the $V_{D-S}$ waveform rapidly reaches the off-time threshold voltage such as during the minimum on-time period. Synchronous rectifier switch S2 may thus be cycled off when the minimum ON-time timer has expired. Synchronous rectifier controller U2 detects a fault condition in response to synchronous rectifier switch S2 turning OFF at the same time as the minimum ON-time timer expiring at time 324. This fault condition is caused by the ringing of the $V_{D-S}$ waveform, which causes the $V_{D-S}$ waveform to trigger the on-time threshold voltage after the minimum OFF-time timer has expired and prior to the next power cycle. In order to prevent the persistent occurrence of this fault condition, controller U2 increases the minimum off-time period such as shown for period 330. The $V_{D-S}$ waveform can then go below the on-time threshold voltage at a time 326 without triggering a fault condition.

Figure 1:
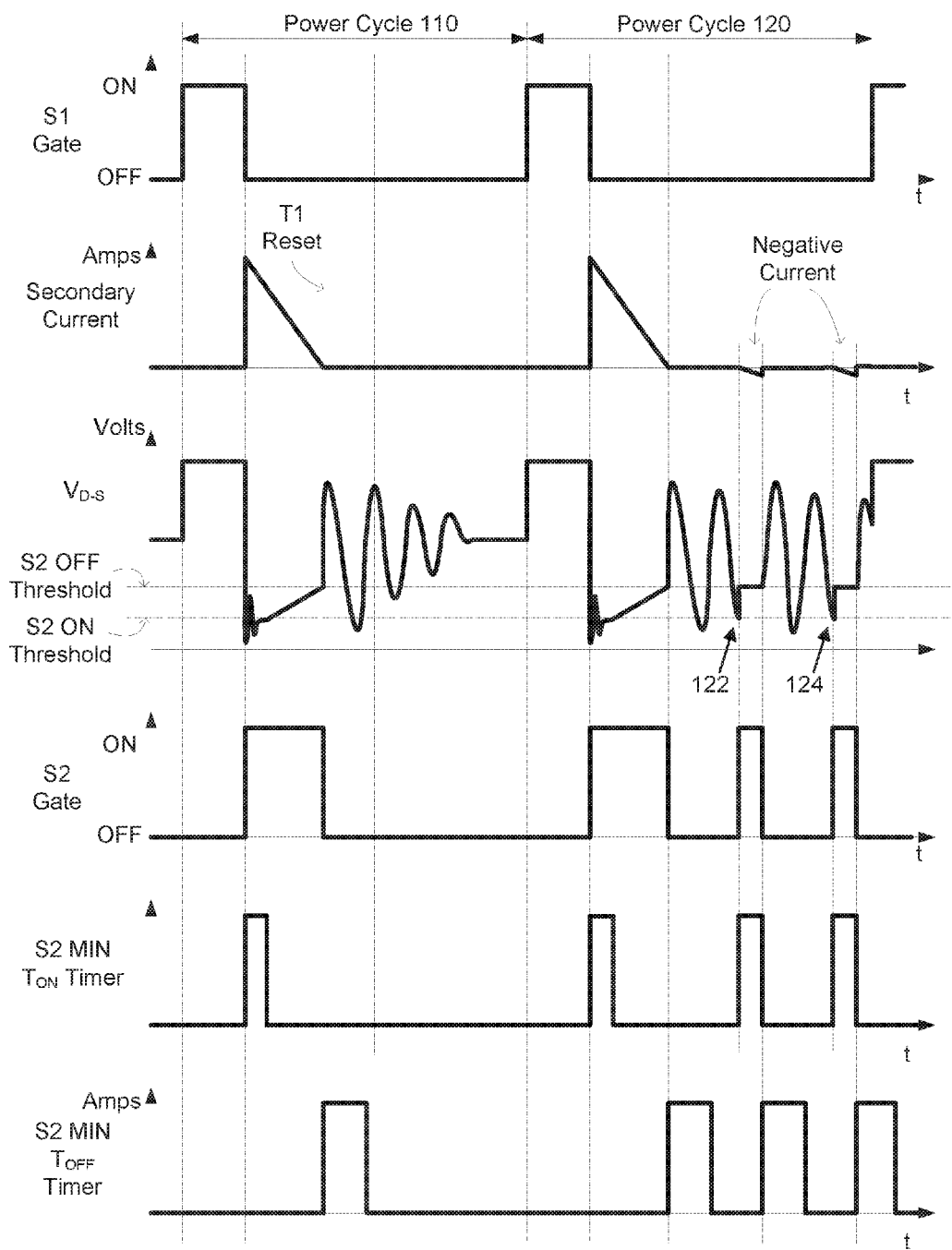
FIG. 1 illustrates waveforms for a conventional flyback converter with synchronous rectifier control.
Figure 4:
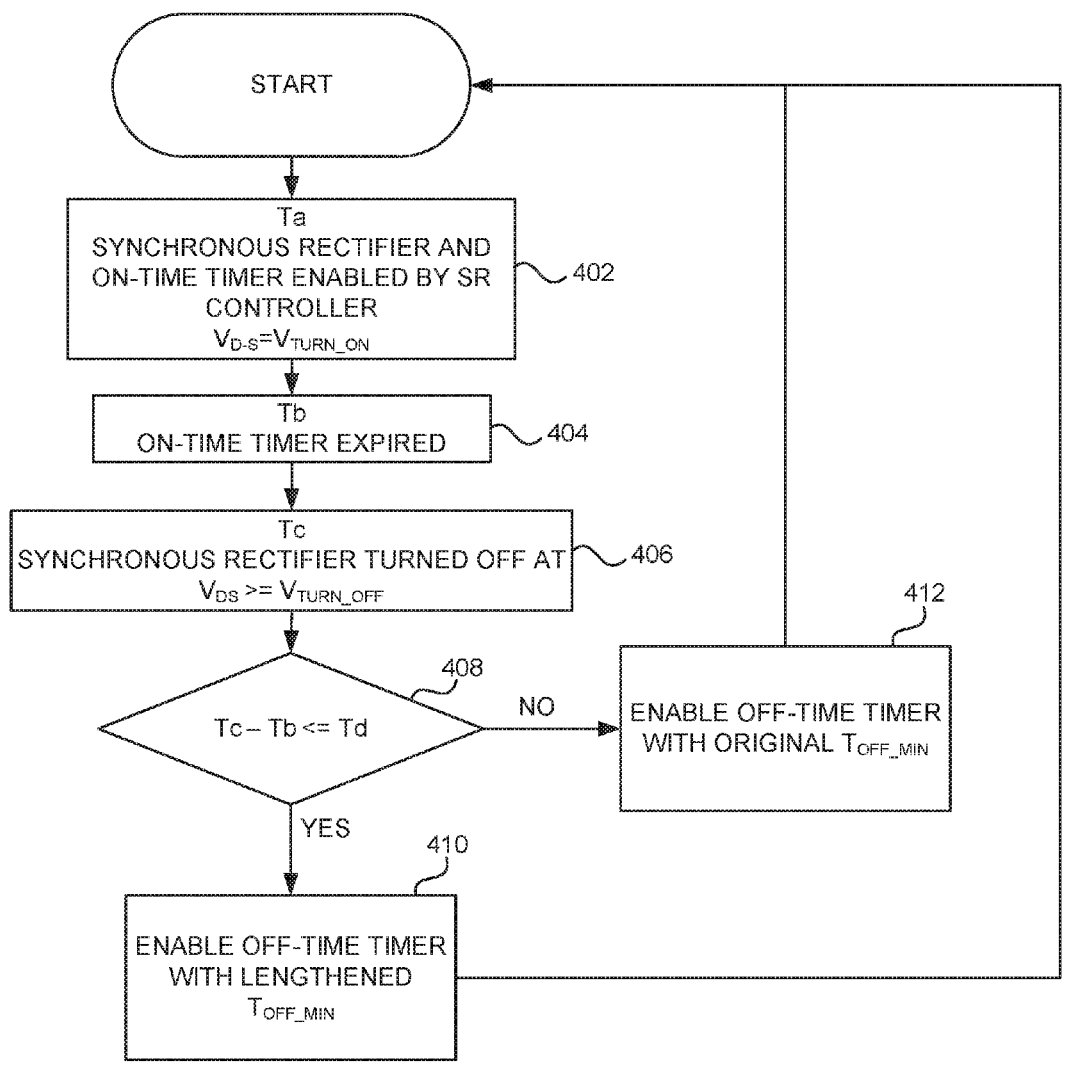
FIG. 4 is a flowchart for an example method of operation in accordance with an embodiment of the disclosure.

A method of operation will now be discussed with reference to a flowchart shown in FIG. 4. Following a start of the method, synchronous rectifier switch S2 is turned on when a $V_{D-S}$ waveform crosses the on-time threshold voltage ($V_{TURN\_ON}$) at a time Ta in an act 402. In that regard, synchronous rectifier controller U2 monitors $V_{D-S}$ (e.g., the $V_{D-S}$ waveform), such as by using voltage sensor 122 (shown in FIG. 1). In response to $V_{D-S}$ triggering the on-time threshold voltage, synchronous rectifier controller U2 also initiates the minimum ON-time timer in act 402. The synchronous rectifier switch must thus be maintained on for at least the minimum on-time period, which expires at a time Tb in an act 404.

An act 406 occurs subsequent to the expiration of the time Tb at a time Tc. In act 406, the synchronous rectifier controller reacts to the the $V_{D-S}$ waveform crossing the time-off threshold voltage ($V_{TURN\_OFF}$) by turning off the synchronous rectifier switch. Time Tc thus signifies the termination of the on-time period following time Ta. Control circuit 226 (FIG. 2) may thus test the duration of this on-time period in an act 408 by determining whether the difference between Tc and Tb is less than or equal to a threshold time duration Td. In other words, act 408 is asking whether the on-time period for the synchronous rectifier switch following time Ta was anomalously short. Such an anomalously short on-time period is shown between times 322 and 324 in FIG. 3 due to the resonant oscillation of the drain-to-source voltage for the synchronous rectifier switch following the switch off-time.

Figure 3:
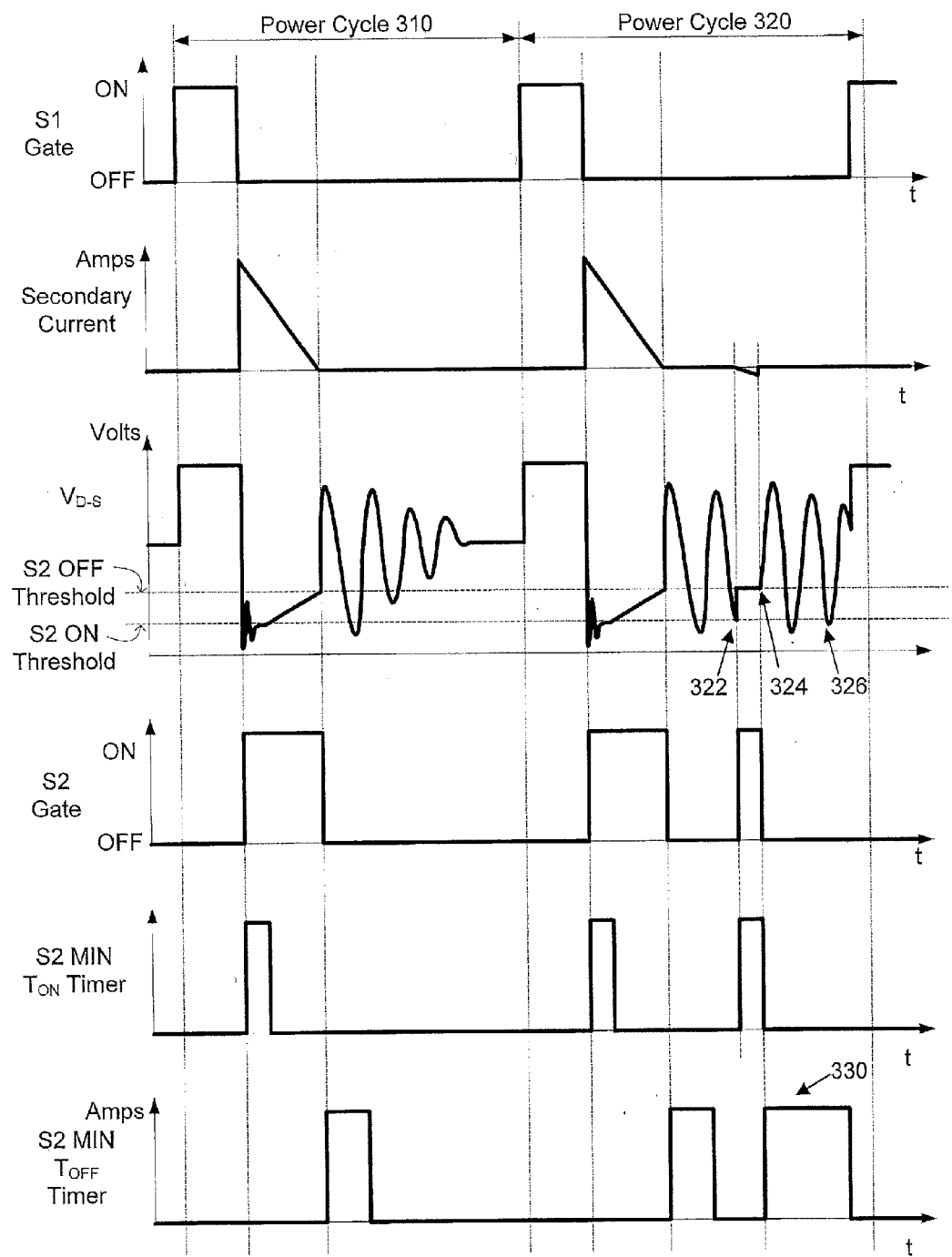
FIG. 3 illustrates waveforms for a flyback converter with adaptive synchronous rectifier control in accordance with an embodiment of the disclosure.

If the determination in act 408 is positive, control circuit 226 (FIG. 2) increases the duration of the minimum off-time period and enables the off-time timer with this revised minimum off-time period in an act 410. Conversely, an on-time period following the cycling off of the power switch has a normal (not anomalously short) duration as shown in FIG. 3 for both power cycles 310 and 320. In such a case, the determination in act 408 would be negative such that the off-time timer is enabled in an act 412 using an unchanged value of the minimum off-time period.

In some embodiments, synchronous rectifier controller U2 detects the fault condition responsive to $V_{D-S}$ reaching, exceeding, and/or triggering the off-time threshold voltage before or at the same time as the minimum ON-time timer expiring. For example, synchronous rectifier controller U2 may detect the fault condition responsive to $V_{D-S}$ reaching the S2 OFF voltage threshold before or at the same time as the minimum ON-time timer expiring. In alternative embodiments, synchronous rectifier controller U2 may detect the fault condition responsive to $V_{D-S}$ exceeding and triggering the off-time threshold voltage before the expiration of a period equalling a sum of the minimum on-time period and a guard-band period ($T_C$). This may be represented as follows:

IF: $T_{ON} \leq T_{ON\_MIN} + T_C$

THEN: Increase $T_{OFF\_MIN}$.

The duration of the guard-band period is a design choice. In some embodiments, the guard-band period may have a duration that is less than or equal to 10% of the minimum on-time period.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter, comprising:
a synchronous rectifier switch coupled to a secondary winding of a transformer; and
a synchronous rectifier controller coupled to the synchronous rectifier switch and configured to:
monitor a switch voltage across the synchronous rectifier switch with regard to an on-time threshold voltage for cycling the synchronous rectifier switch on for a first on-time period and with regard to an off-time threshold voltage for cycling the synchronous rectifier switch off to cause the switch voltage to cycle through resonant oscillations in which one of the resonant oscillations has a magnitude to cause the controller to cycle the synchronous rectifier switch on for a second on-time period;
detect a fault condition in response to the second on-time period being less than or equal to a sum of a minimum on-time period and a guard band period; and
increase a minimum off-time period for the synchronous rectifier switch in response to the detection of the fault condition to prevent the switch voltage from again falling below the on-time threshold voltage responsive to the resonant oscillations.

2. The switching power converter of claim 1, wherein the synchronous rectifier controller is configured to:
monitor a duration of the minimum on-time period using a minimum on-time timer.

3. The switching power converter of claim 2, wherein the guard band period has a zero extent.

4. The switching power converter of claim 2, wherein the guard band period equals a programmable percentage of the minimum on-time period.

5. The switching power converter of claim 4, wherein the guard band period is no more than 10% of the minimum on-time period.

6. The switching power converter of claim 1, further comprising:
a power switch coupled to a primary winding of the transformer; and
a primary controller coupled to the power switch and configured to turn on and to turn off the power switch to regulate an output voltage across a load coupled to the secondary winding.

7. The switching power converter of claim 1, wherein the synchronous rectifier switch is a field-effect transistor (FET).

8. The switching power converter of claim 1, wherein the controller is configured to increase the minimum off-time period to no more than a maximum amount.

9. A method comprising:
switching off a synchronous rectifier switch coupled to a second winding of a transformer following a first on-time period responsive to a switch voltage across the synchronous rectifier switch rising above an off-time threshold voltage to cause the voltage to begin cycling through resonant oscillations;
switching on the synchronous rectifier switch for a second on-time period responsive to one of the resonant oscillations causing the switch voltage to drop below an on-time threshold voltage;
detecting a fault condition responsive to the second on-time period being less than or equal to a sum of the minimum on-time period and a guard band period; and
increasing a minimum off-time period for the synchronous rectifier switch responsive to the detection of the fault condition to prevent the switch voltage from again falling below the on-time threshold voltage responsive to the resonant oscillations.

10. The method of claim 9, wherein detecting the fault condition comprises detecting that the on-time period equals the minimum on-time period.

11. The method of claim 9, wherein the guard band period is a programmable percentage of the minimum on-time period.

12. The method of claim 11, wherein the guard band period is less than or equal to 10% of the minimum on-time period.

13. The method of claim 9, further comprising cycling a power switch coupled to a primary winding of the transformer to regulate a voltage across a load coupled to the secondary winding.

14. A synchronous rectifier controller, comprising:
a voltage sensor configured to sense a voltage across a synchronous rectifier switch for connection to a secondary winding for a flyback converter;

a controller configured to cycle the synchronous rectifier switch on for a first on-time period equaling at least a minimum-on time period responsive to the sensed voltage falling below an on-time threshold voltage, wherein the controller is further configured to cycle the synchronous rectifier switch off responsive to the sensed voltage rising above an off-time threshold voltage to cause the sensed voltage to cycle through resonant oscillations in which one of the resonant oscillations causes the controller to cycle the synchronous rectifier switch on for a second on-time period; and a first timer configured to time the minimum on-time period, wherein the controller is further configured to detect a fault condition responsive to the second on-time period being less than or equal to a sum of the minimum on-time period and a guard band period in response to one of the resonant oscillations causing the sensed voltage to rise above the off-time threshold voltage, and wherein the controller is further configured to increase a minimum off-time period for the synchronous rectifier switch responsive to the detection of the fault condition to prevent the sensed voltage from again falling below the on-time threshold voltage responsive to the resonant oscillations.

15. The synchronous rectifier controller of claim 14, wherein the guard band period is less than or equal to 10% of the minimum on-time period.

16. The synchronous rectifier controller of claim 14, wherein the controller is further configured to increase the minimum off-time period to no more than a maximum amount.

17. The synchronous rectifier controller of claim 14, further comprising a second timer configured to time the minimum off-time period.

* * * * *